United States Patent
Graham et al.

(10) Patent No.: US 6,594,538 B1
(45) Date of Patent: Jul. 15, 2003

(54) METHOD FOR IDENTIFYING AND APPLYING FAMILIES OF PART SHAPE VARIATIONS

(75) Inventors: Michael E. Graham, Slingerlands, NY (US); Marc T. Edgar, Clifton Park, NY (US); John D. Jackson, Wyoming, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/506,184

(22) Filed: Feb. 17, 2000

Related U.S. Application Data

(60) Provisional application No. 60/170,165, filed on Dec. 10, 1999.

(51) Int. Cl.[7] .............................................. G06F 19/00
(52) U.S. Cl. ....................... 700/110; 700/109; 700/177; 703/2; 702/84
(58) Field of Search ................... 700/99, 161, 108–110, 700/173–177, 193–195, 186, 187, 51, 52; 703/2; 702/82, 84, 81, 167–169

(56) References Cited

U.S. PATENT DOCUMENTS

| | | | |
|---|---|---|---|
| 3,633,011 A | | 1/1972 | Bederman et al. ..... 235/151.11 |
| 4,296,474 A | * | 10/1981 | Hurt ........................... 702/168 |
| 4,918,627 A | * | 4/1990 | Garcia et al. ................. 702/82 |
| 5,715,167 A | | 2/1998 | Gupta et al. ........... 364/474.28 |
| 6,094,793 A | | 8/2000 | Szuba ........................ 29/33 P |
| 6,356,861 B1 | * | 3/2002 | Singhal et al. ................. 703/2 |
| 6,370,437 B1 | * | 4/2002 | Carter et al. .................. 700/52 |

* cited by examiner

Primary Examiner—Leo Picard
Assistant Examiner—Steven R. Garland
(74) Attorney, Agent, or Firm—David Goldman; Enrique J. Mora; Beusse, Brownlee, Bowdoin & Wolter, PA

(57) ABSTRACT

A method for identifying and characterizing shape variations in parts. Measurements are taken of a population of parts and the shapes of the parts are expressed as a function having a plurality of coefficients. Discrete or function error maps are developed from the coefficients and a principal components analysis is performed on the error maps to identify the principal components of variation of the parts. The parts may be grouped into sub-populations representing ranges of variation along each of the principal components of variation, and downstream processes may be controlled differently for each sub-population. In one embodiment, a typical (re-generated) part shape is identified along multiple principal components of variation, and a tool path is controlled to be responsive to the typical part shape. Information regarding the principal components of variation may further be used to revise upstream manufacturing processes to advantageously affect the distribution of error in subsequently manufactured parts.

22 Claims, 4 Drawing Sheets

METHOD FOR IDENTIFYING AND APPLYING FAMILIES OF PART SHAPE VARIATIONS

This application claims the benefit of the Dec. 10, 1999, filing date of provisional patent application 60/170,165.

BACKGROUND OF THE INVENTION

This invention relates generally to the field of manufacturing, and more particularly to the field of tolerance control for manufactured parts.

Shape variation in manufactured parts is a normal occurrence. Parts are typically specified to have shapes that fall within predetermined dimensional limits. Dimensional control is important to downstream manufacturing operations because the success of some downstream manufacturing operations depends upon the as-manufactured shapes of the parts as they arrive to be processed. In a similar way, dimensional control is important to end users because it ensures the proper functionality of the part or final assembly. Furthermore, shape control is the key concept underlying the cost savings possible using interchangeable parts.

In many cases, tolerances are assigned to ensure that the shape of the part will be predictable or repeatable. It is not the exact shape of the part that drives the tolerance band, rather, it is the level of required repeatability. In general, the greater the required repeatability, the smaller the tolerance bands, and the more expensive the part. There is a cost savings opportunity where the cost of holding very tight tolerances has outstripped the savings of using fully interchangeable parts.

SUMMARY OF THE INVENTION

Thus there is a need for a method for controlling the variability of parts that does not rely solely on the control of manufacturing tolerances. With the convergence of flexible measuring technology in the form of Coordinate Measuring Machines (CMM's), and computer controlled Numerical Control (NC) machining, we have an opportunity to develop techniques of manufacture that do not rely on fully interchangeable parts, and thereby do not require the expense of extremely tight tolerances. The inventors have accomplish this by substituting shape predictability for shape repeatability.

Accordingly, a method is disclosed herein for identifying shape variations in parts, the method comprising the steps of: obtaining measurements representing the shape of each of a plurality of parts; using the measurements to express the shape of each part as a respective function of a nominal part shape or as a function of a location in a part coordinate system, each function comprising a respective plurality of coefficients; and using the coefficients to define an error map for each respective part. Each respective function may be a discrete function or polynomial or trigonometric equation. The functions describing each of the plurality of parts can be combined to form a single function or set of functions describing the characteristics of the plurality. The method is further described as including the step of performing a principal component analysis across the error maps to identify the principal components of variation in the error maps. Once the principal components of variation are known, a plurality of sub-populations of the parts may be defined by identifying a plurality of ranges within at least one of the principal components of variation. Parts grouped into the various sub-populations may be treated differently for downstream processes. Furthermore, upstream processes may be controlled in order to affect the distribution of future parts within the various sub-populations.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
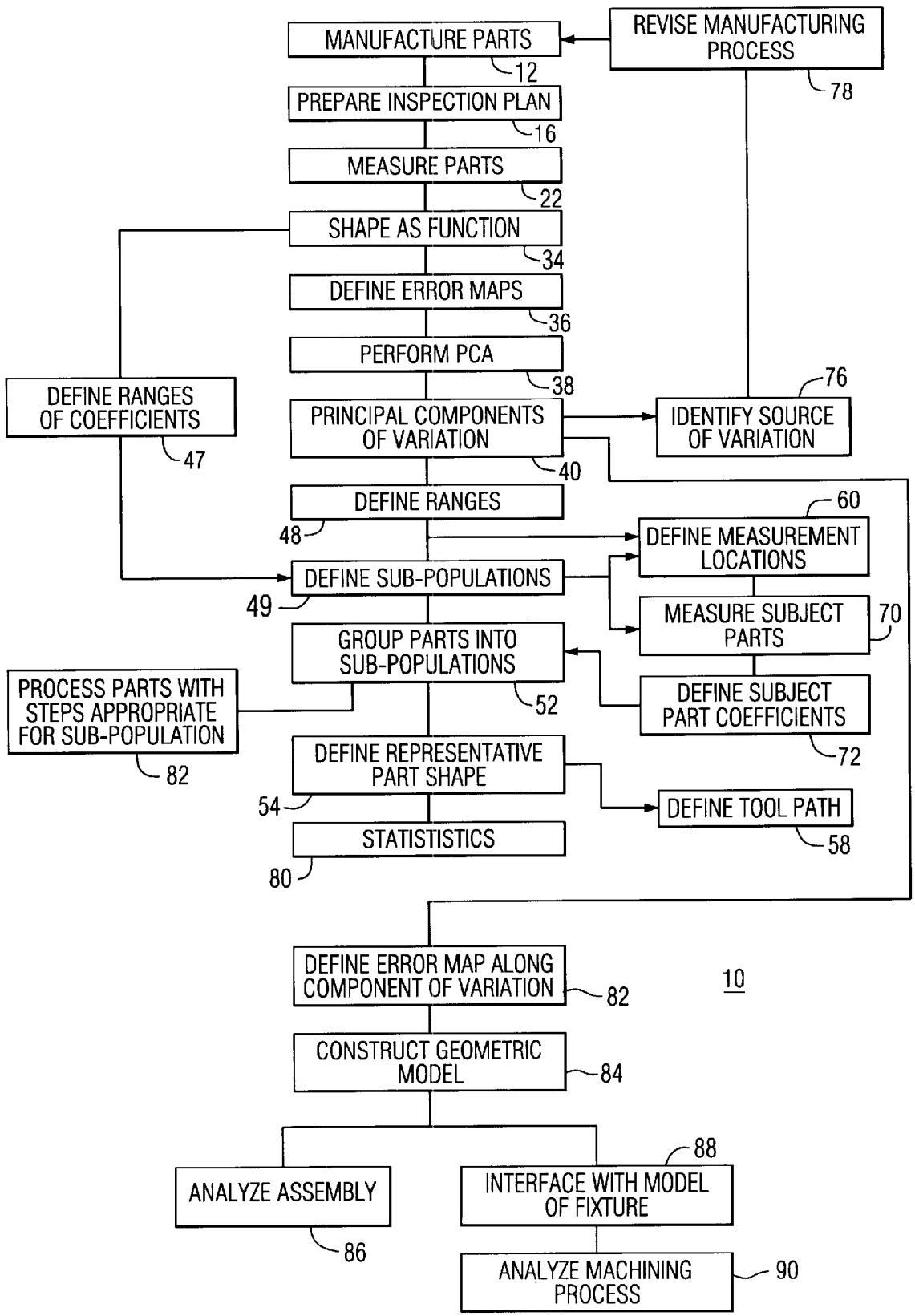
FIG. 1 is a flow diagram of a process for identifying, characterizing and utilizing information regarding the shape of parts.

FIG. 1 illustrates a method 10 of identifying and classifying families of part dimensional errors, as well as a method for applying these classifications. The classification technique described here will work equally well with parts or part features.

By measuring a plurality of similar parts and constructing error maps of their variations from nominal, it is possible to generate error maps that describe representative parts models which span the original distribution of measured parts. Such error maps describe various independent modes of variation. For purposes of this disclosure, an error map is a functional or discrete description of errors as they vary across the surface of a part. It includes such methods as discrete errors stored at individual locations, functional maps of error variation across the part surface, and maps of error variation as a function of spatial location. Methods of error mapping are well known and are not disclosed herein.

Figure 2:
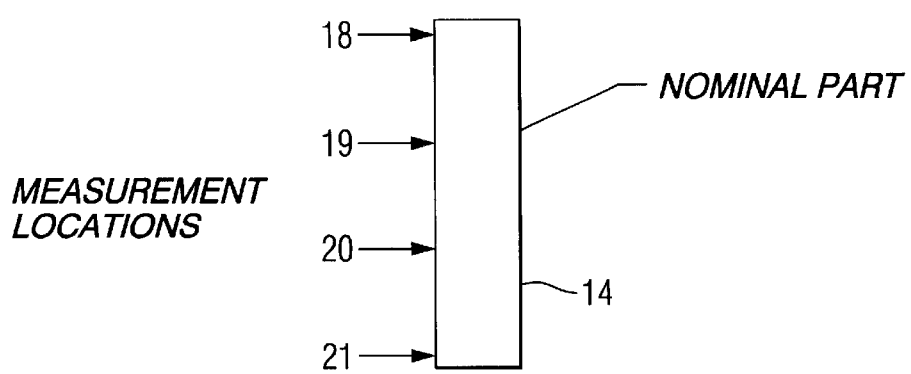
FIG. 2 is a plan view of a nominal part.

A plurality of parts is manufactured at step 12 using any known process or manufacturing method. For example, a plurality of parts, such as nominal part 14 of FIG. 2, may be formed by a machining process.

An inspection plan is then created at step 16 for the part 14. The inspection plan may be simply a list of specific locations 18–21 at which to measure the part 12. It is preferable to include measurements of part surface deviations from nominal at all critical surfaces of the part. Examples of critical surfaces include datum surfaces, mating surfaces, surfaces to be secondarily machined, and performance-critical surfaces. The inspection plan should include a sampling of points on each of the critical surfaces, and each point should be defined by a unique spatial location (X,Y,Z). The result of each measurement should be expressed in a format appropriate for the method of error mapping to be used. The sampling frequency, e.g. the distance between measurement locations 18–21 will determine the scale of the error patterns disclosed by this process.

Figure 3:
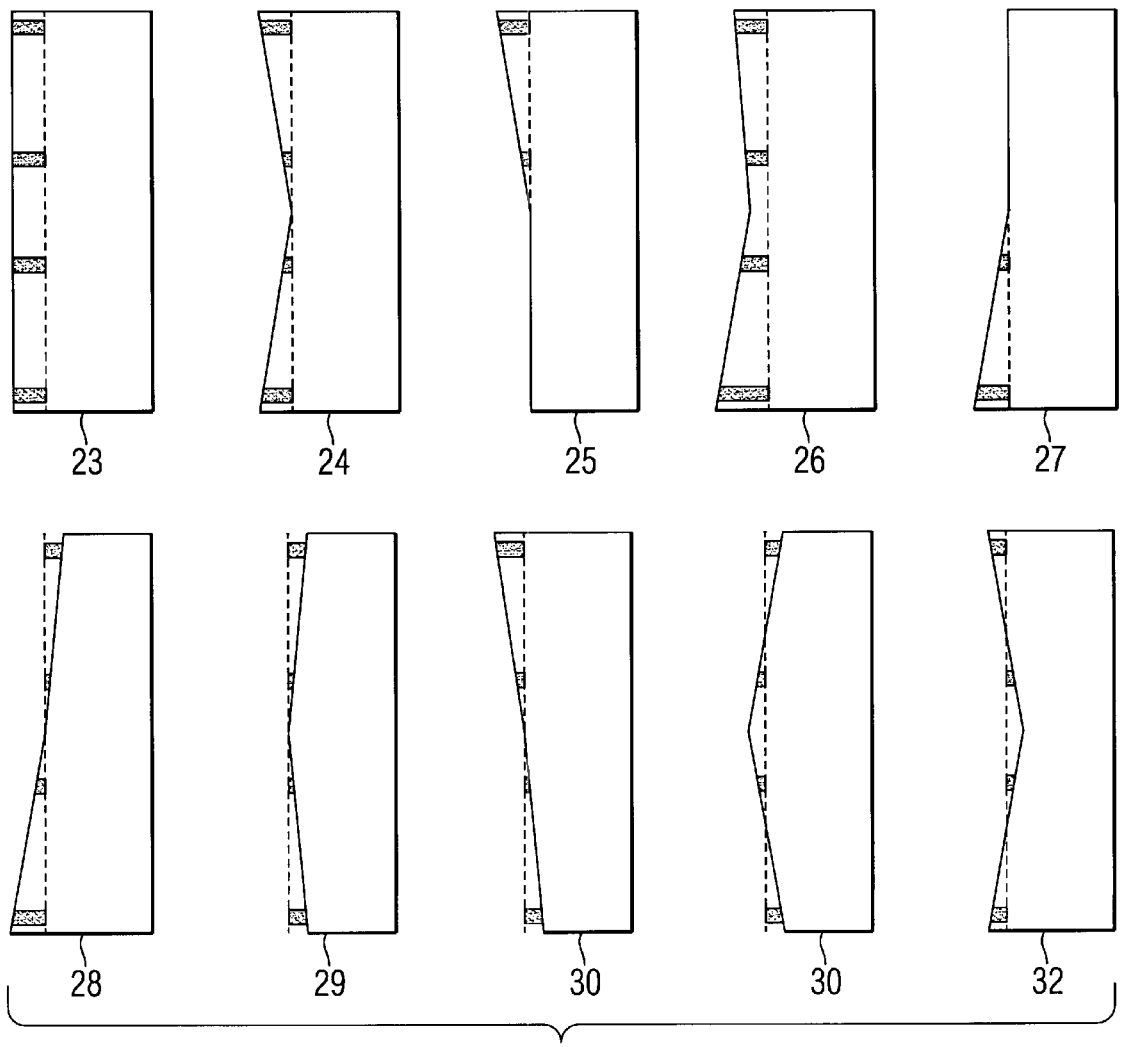
FIG. 3 illustrates a sample of parts measured with respect to the nominal part.

The next step 22 is to measure a representative sample of parts 23–32 as shown in FIG. 3. The sample size may vary with the variety, amount, and extent of the dimensional errors to be mapped. For each part, the inspection plan is followed and the results are recorded for each part 23–32 individually.

The measurements may then be used in step 34 to express the shape of each part 23–32 as a respective function of the shape of the nominal part 12, or as a function of a location in a part coordinate system. The function may be a polynomial, trigonometric or other mathematical equation, but will in any event, include a plurality of coefficients. For example, if the shape of the measured part is expressed as a quadratic equation of the location along a linear coordinate system, the appropriate equation for a particular part may be Y=AX+B, where Y is the as-measured shape of the particular part, X is the location along the linear axis of the nominal part 12, and A and B are coefficients determined by measuring the shape of the particular part. A set of coefficients will be determined for each of the measured parts 23–32.

Step 36 represents the construction of an error map for each part. These maps may be one of many varieties. In one embodiment the error map takes the form of a series of numbers, each representing a numeric coefficient of the part shape error. For example:

| Part Number | Coef. 1 | Coef. 2 | Coef. 3 | Coef. 4 . . . | Coef. J |
|---|---|---|---|---|---|
| 1 | $C_{11}$ | $C_{12}$ | $C_{13}$ | $C_{14}$ | $C_{1j}$ |
| 2 | $C_{21}$ | $C_{22}$ | $C_{23}$ | $C_{24}$ | $C_{2j}$ |
| 3 | $C_{31}$ | $C_{32}$ | $C_{33}$ | $C_{34}$ | $C_{3j}$ |
| i | $C_{i1}$ | $C_{i2}$ | $C_{i3}$ | $C_{i4}$ | $C_{ij}$ |

The coefficients may be derived from the functional equations developed in step 34, i.e. a functional error map, or they may be a discrete representation of the deviation of the actual part shape 23–32 from the nominal part shape 12.

In step 38 a Principal Component Analysis (PCA) is performed across the error maps constructed in step 36. The PCA results in the identification of the principal components of variation 40. The principal components are found by calculating the eigenvectors of the data covariance matrix formed from the error maps. For example, a data covariance matrix may take the following form, where COV is the covariance coefficient and VAR is the variance.

| $VAR_{C1}$ | $COV_{C1C2}$ | $COV_{C1C3}$ | $COV_{C1C4}$ . . . | $COV_{C1Cj}$ |
|---|---|---|---|---|
| $COV_{C2C1}$ | $VAR_{C2}$ | $COV_{C2C3}$ | $COV_{C2C4}$ . . . | $COV_{C2Cj}$ |
| $COV_{C3C1}$ | $COV_{C3C2}$ | $VAR_{C3}$ | $COV_{C3C4}$ . . . | $COV_{C3Cj}$ |
| $COV_{C4C1}$ | $COV_{C4C2}$ | $COV_{C4C3}$ | $VAR_{C4}$ . . . | $COV_{C4Cj}$ |
| . . . | | | | |
| $COV_{CjC1}$ | $COV_{CjC2}$ | $COV_{CjC3}$ | $COV_{CjC4}$ . . . | $VAR_{Cj}$ |

Figure 4:
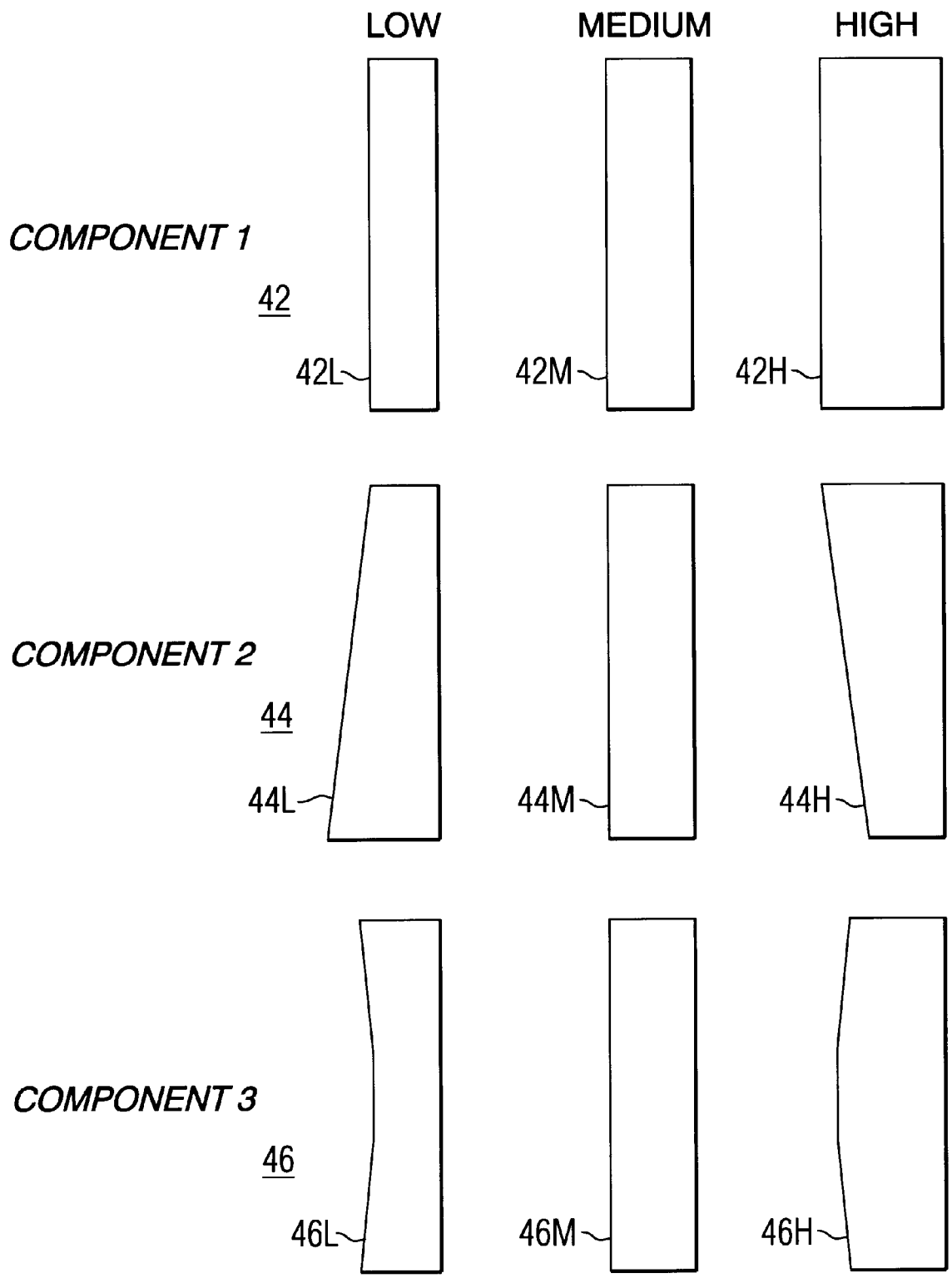
FIG. 4 illustrates three values for each of three principal components of variation of the parts of FIG. 3.

The principal components of variation in the error maps represent the independent patterns of variation within the parts. For example, FIG. 4 illustrates three principal components of variation 42,44,46 that may be found in parts 23–32 of FIG. 3. At step 48 of FIG. 1, each of the components of variation is segmented into a plurality of ranges, for example a low value L, a medium value M, and a high value H, thereby defining at step 49 a corresponding plurality of sub-populations wherein a part in a subpopulation will exhibit a characteristic value of a principal component of variation within a respective one, several, or all of the plurality of ranges. Part shapes representing each of a low, medium and high value of the three principal components 42,44,46 are illustrated as 42L, 42M, 42H, 44L, 44M, 44H, 46L, 46M, and 46H respectively. Even if a principal component analysis has not been performed, it is possible in step 47 to define ranges of the coefficients used to functionally express the shape error in step 34. Knowledge of the principal components of variation allows one to reconstruct error maps that are representative of the observed patterns of error.

Figure 5:
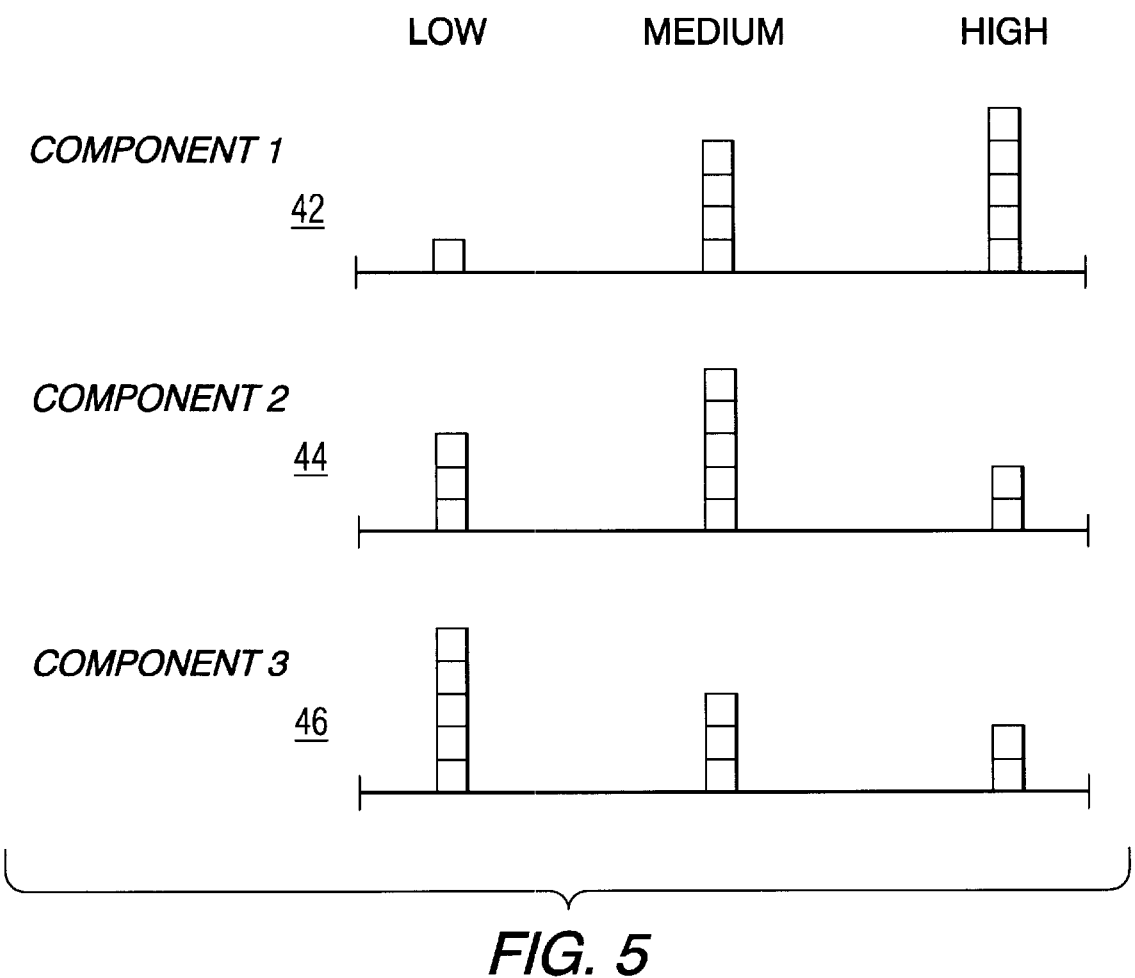
FIG. 5 illustrates population frequency histograms for three principal components of variation.
Figure 6:
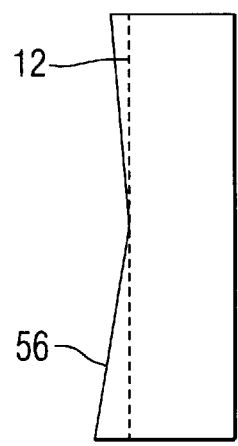
FIG. 6 illustrates a typical part compared to a nominal part.

It is possible at step 52 to segment the population of parts into sub-populations that contain parts of greater and lesser degrees of deformation across the principal components of variation. FIG. 5 illustrates histograms of the error along each of the three principal component of error dimensions 42,44,46 of the error maps for parts 23–32. Each of the parts 23–32 is assigned a value of low, medium or high for each of the principal components 42,44,46. Using known clustering techniques, it is then possible to reconstruct representative error maps from the principal components that represent each of the sub-populations of parts. As an example, by choosing the modal coordinate value along each of the eigenvectors, one may define at step 54 a typical part shape by computing a representative error map of a typical part 56, as illustrated in FIG. 6. The typical part 56 is illustrated in FIG. 6 as applied to the nominal part 12 shown in phantom. One may apply the representative error maps to nominal parts to create representative parts for each sub-population. These representative parts model the shapes of the sub-populations of parts from which their error maps are derived. These representative parts provide the opportunity to understand the nature of the deformations that may be expected in a full population of parts.

The representative parts allow several interesting and novel applications in the manufacturing shop floor environment. For example, it is possible at step 58 to generate numerical control tool paths from each of these representative parts. These tool paths may be used to control secondary processes on the sub-population represented by each representative part. For example, a set of tool paths may be constructed for the typical part 56 shown in FIG. 5. Creating tool paths for each of the part sub-populations facilitates improved control of the locations at which secondary numerical controlled processes are performed on the parts. Even if the tool path is not conveniently controlled by a numerical control process, alternative downstream processes may be selected at step 74 for the different subpopulations of parts.

Figure 7:
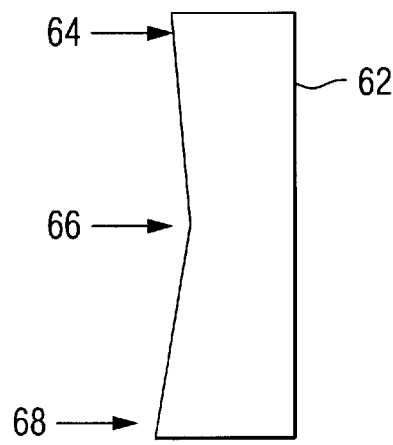
FIG. 7 illustrates the reduced number of measurement locations used for a subject part.

At step 60, the representative error maps made from the principal components are used to identify a set of measurement locations which efficiently determine the subpopulation of a given production part. This is illustrated in FIG. 7 where measurement locations 64,66,68 are selected for subject part 62. The number of measurement locations may be substantially smaller than the number of measurement locations originally used to characterize the population.

By using only those measurement locations that best correlate with overall modes of observed error, we can reduce the number of surface measurements required to disclose those errors. There is a savings in processing time to be realized by reducing the number of surface measurements, especially on parts with sculptured surfaces. Using these measurement locations 64,66,68 allows one to take advantage of sub-population specific tool paths without requiring excessive measurement time and expense. The measurements of subject part 62 are taken at step 70, thereby allowing the shape of part 62 to be expressed as a function of a nominal part shape using subject part coefficients at step 72, and allowing the part 62 to be grouped into one of the sub-populations at step 52.

The selection of measurement locations may also be made by considering the relative importance of the various components of variation. For example, the PCA performed to identify components of variation 1, 2 and 3 of FIG. 4 may indicate that components 2 and 3 each provide 45% of the variation of the part dimensions. Thus it may be necessary to select three measurement locations 64,66,68, as illustrated in FIG. 7, to adequately characterize a part. However, if the PCA indicates that component of variation 2 provides 80% of the variation and component 1 provides only 10% of the variation, it may be necessary to select only two measurement locations 64,68 to adequately characterize the part, since the variation of location 66 will be relatively smaller than the variation of locations 64 and 68. Thus, not only the components of variation, but also the relative weights of the various components of variation may be analyzed to advantageously affect downstream processes.

It is likely that parts grouped by principal components of variation will have different operating characteristics among the groups. Such characteristics may include differing part life, differing noise level during operation, differing efficiency of operation, etc. Therefore, it may be useful at step 82 to process parts with steps appropriate to their sub-population. For, example, parts classified on the basis of their principal components of shape variation can be arranged into assemblies on the basis of their shape in ways that improve their performance when compared to the performance of an assembly composed of a randomly chosen set of parts. The improvements could take the form of either more predictable performance or better overall performance. As the differences in operating characteristics due to part shape are quantified, they may be used to control downstream processes that are not related to manufacturing steps, for example, to define optimal part pricing, maintenance schedules, or marketing plans.

Knowledge of the principal components of variation may further be used at step 76 to identify the source of the variation in the parts. This knowledge may be used at step 78 to revise a manufacturing process or program, thereby advantageously affecting the error distribution for subsequently manufactured parts.

It is possible at step 80 to generate statistics showing the distribution of the plurality of parts among the various sub-populations for purposes such as quality control, substantiation of product quality, visualization or cost reporting.

In one embodiment of this invention, error maps may be constructed at step 82 along one or more of the principal components of variation at desired levels of statistical confidence. For example, two error maps may be constructed along principal component 3 of FIG. 4, such as at plus and minus two standard deviations from a mean value. These two error maps represent a model envelope within which a part may be expected to fall with a predetermined level of confidence. These error maps may be used at step 84 to construct geometric models, such as CAD models, which in turn may be used to further analyze downstream processes. For example, such a CAD model may be used at step 86 to analyze downstream assembly tolerances to assess the feasibility of assembling the part with mating parts. Alternatively, such a CAD model may be interfaced with a CAD model of a machine fixture at step 88, with the resulting tool used at step 90 to analyze a downstream manufacturing process, such as to generate a prediction of the distribution of final machining errors.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method for identifying shape variations in parts, the method comprising the steps of:

obtaining measurements representing the shape of each of a plurality of parts;

using the measurements to express the shape of each part as a respective function, the function being one of the group of a discrete function, a function of a nominal part shape, and a function of a location in a part coordinate system, each function comprising a respective plurality of coefficients;

using the coefficients to define an error map for each respective part; and performing a principal component analysis across the error maps to identify the principal components of variation in the error maps.

2. The method of claim 1, wherein each respective function comprises a polynomial or trigonometric equation or a set of discrete measurements.

3. The method of claim 1, further comprising the steps of:

defining a plurality of ranges within at least one of the principal components of variation; and defining a plurality of sub-populations wherein a part in a sub-population will exhibit a characteristic value of a principal component of variation within a respective one of the plurality of ranges.

4. The method of claim 3, further comprising the steps of:

obtaining a measurement representing the at least one of the principal components of variation for a subject part;

grouping the subject part into one of the sub-populations.

5. The method of claim 3, further comprising the steps of:

generating statistics showing the distribution of the plurality of parts among the plurality of sub-populations.

6. The method of claim 3, further comprising:

defining a plurality of ranges within each of a plurality of the principal components of variation; and defining a plurality of sub-populations wherein a part in a sub-population will exhibit characteristic values for each of the plurality of principal components of variation within the respective plurality of ranges.

7. The method of claim 3, further comprising the step of defining at least one measurement location for obtaining a measurement of a subject part for assigning the subject part to a sub-population.

8. The method of claim 7, further comprising the steps of:

obtaining a measurement for the subject part at the at least one measurement location;

assigning the subject part to a sub-population; and controlling a process utilizing the subject part in response to the assigned sub-population of the subject part.

9. The method of claim 1, further comprising the steps of:

defining a plurality of ranges within each of the principal components of variation; and defining a plurality of sub-populations for each principal component of variation wherein a part in a sub-population will exhibit a respective principal component of variation within a respective one of the plurality of ranges.

10. The method of claim 9, further comprising the steps of:

grouping the plurality of parts into the respective sub-populations for each principal component of variation.

11. The method of claim 1, further comprising:

defining a plurality of ranges of the coefficients; and defining a plurality of sub-populations wherein a part in a sub-population will exhibit coefficients within a respective one of the plurality of ranges.

12. The method of claim 11, further comprising the steps of:

obtaining measurements representing the shape of a subject part;

using the measurements to express the shape of the subject part as a function of the nominal part shape, the function comprising subject part coefficients; and grouping the subject part into one of the sub-populations based upon which of the plurality of ranges into which a value of the subject part coefficients fall.

13. The method of claim 1, further comprising the steps of:

evaluating manufacturing processes used to produce the plurality of parts to identify a source of at least one of the principal components of variation; and revising the manufacturing processes to effect the distribution of variation among parts produced by the manufacturing processes along the at least one of the principal components of variation.

14. The method of claim 13, further comprising the step of revising the manufacturing processes to reduce the distribution of variation among parts produced by the manufacturing processes along the at least one of the principal components of variation.

15. The method of claim 1, further comprising the steps of:

defining a representative value of the variation of the plurality of parts for at least one principal component of variation; and using the representative value to define a typical part shape.

16. The method of claim 15, further comprising the step of:

using the typical part shape to define a tool path for a manufacturing process.

17. The method of claim 1, further comprising the steps of:

defining a representative value of the variation of the plurality of parts for each principal component of variation; and using the representative values to define a typical part shape.

18. A method for identifying and characterizing shape variations in parts, the method comprising the steps of:

obtaining measurements representing the shape of each of a plurality of existing parts;

using the measurements to define an error map for each respective part, the error map representing the deviation of the part shape from a nominal part shape; and performing a principal component analysis across the error maps to identify the principal components of variation in the error maps.

19. The method of claim 18, further comprising the steps of:

using the measurements to express the shape of each part as a respective function of a nominal part shape, each function comprising a respective plurality of coefficients; and using the coefficients to define the error map for each respective part.

20. The method of claim 18, further comprising the steps of:

defining an error map along at least one of the principal components of variation at a predetermined level of statistical confidence;

constructing a geometric model from the error map defined along the at least one of the principal components of variation.

21. The method of claim 20, further comprising the step of using the geometric model to analyze an assembly.

22. The method of claim 20, further comprising the step of interfacing the geometric model with a geometric model of a machine fixture to analyze a downstream manufacturing process.

* * * * *